(12) United States Patent
Centemeri et al.

(10) Patent No.: US 9,100,940 B2
(45) Date of Patent: Aug. 4, 2015

(54) SYSTEM AND METHOD FOR EXTENDED WIRELESS ACCESS GATEWAY SERVICE PROVIDER WI-FI OFFLOAD

(75) Inventors: Marco C. Centemeri, Rho (IT); Luis Lopez, Oleiros (ES); Anand Oswal, Pleasanton, CA (US); Steve Wood, Ottawa (CA); William Wan, Hong Kong (HK)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/305,010

(22) Filed: Nov. 28, 2011

(65) Prior Publication Data

US 2013/0138823 A1  May 30, 2013

(51) Int. Cl.
*H04W 76/02* (2009.01)
*H04W 92/02* (2009.01)

(52) U.S. Cl.
CPC .......... *H04W 76/022* (2013.01); *H04W 76/021* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 6,542,491 B1* | 4/2003 | Tari et al. | | 370/338 |
| 6,608,832 B2* | 8/2003 | Forslow | | 370/353 |
| 7,039,688 B2* | 5/2006 | Matsuda et al. | | 709/220 |
| 7,536,464 B1* | 5/2009 | Dommety et al. | | 709/228 |
| 7,577,723 B2* | 8/2009 | Matsuda et al. | | 709/220 |
| 8,019,346 B2* | 9/2011 | Sachs et al. | | 455/439 |
| 8,023,469 B2* | 9/2011 | Sachs et al. | | 370/331 |
| 8,285,875 B2* | 10/2012 | Gandhewar et al. | | 709/245 |
| 2002/0133573 A1* | 9/2002 | Matsuda et al. | | 709/220 |
| 2004/0242195 A1 | 12/2004 | Chun et al. | | |
| 2006/0036733 A1* | 2/2006 | Fujimoto et al. | | 709/225 |
| 2006/0039237 A1* | 2/2006 | Mori | | 367/14 |
| 2006/0155833 A1* | 7/2006 | Matsuda et al. | | 709/220 |
| 2008/0205345 A1* | 8/2008 | Sachs et al. | | 370/332 |
| 2009/0040964 A1 | 2/2009 | Zhao et al. | | |
| 2009/0131053 A1* | 5/2009 | Sachs et al. | | 455/436 |
| 2009/0168754 A1* | 7/2009 | Shan | | 370/352 |
| 2009/0285179 A1* | 11/2009 | Jones et al. | | 370/331 |
| 2010/0191839 A1* | 7/2010 | Gandhewar et al. | | 709/220 |
| 2010/0199332 A1 | 8/2010 | Bachmann et al. | | |
| 2011/0211574 A1 | 9/2011 | Li et al. | | |
| 2011/0255471 A1* | 10/2011 | Sundell et al. | | 370/328 |
| 2012/0079271 A1 | 3/2012 | Cordeiro et al. | | |
| 2012/0201222 A1 | 8/2012 | Muhanna et al. | | |

OTHER PUBLICATIONS

"3rd Generation Partnership Project; Technical Specification Group Services and System Aspects; Architecture enhancements for non-3GPP accesses", Sep. 2010, 3GPP TS 23.402 V10.1.0, Technical Specification, Release 10.*

(Continued)

*Primary Examiner* — Ninos Donabed
(74) *Attorney, Agent, or Firm* — Patent Capital Group

(57) ABSTRACT

A method is provided in one example embodiment and includes receiving a dynamic host configuration protocol (DHCP) discovery signal at a wireless network element from a customer premise equipment; requesting that a data session be established at a gateway; receiving an Internet protocol (IP) address; and communicating the IP address to the customer premise equipment.

15 Claims, 7 Drawing Sheets

(56) References Cited

OTHER PUBLICATIONS

3 GPP Organizational Partners, "3rd Generation Partnership Project: Technical Specification Group Services and System Aspects; Architecture Enhancements for non-3GPP Accesses (Release 11)," 3 GPP TS 23.402 V11.0.0 (Sep. 2011) © 2011, 232 pages.

3 GPP Organizational Partners, "3rd Generation Partnership Project: Technical Specification Group Services and System Aspects; Study on S2a Mobility Based on GTP & WLAN Access to EPC (SaMOG); Stage 2 (Release 11)," 3 GPP TR 23.852 V0.4.0 (Oct. 2011) © 2011, 38 pages.

U.S. Appl. No. 13/554,873, filed Jul. 20, 2012, entitled "System and Method for Supporting Web Authentication," Inventors: Rajesh S. Pazhyannur, et al.

EPO Nov. 22, 2012 European Search Report and Written Opinion from EP Application No. 12169631.4.

"Presentation of SaMOG", 3GPP Draft 3BF-11039_WAS JBF-11004-SAMOG, Nov. 3, 2011.

"Universal Mobile Telecommunications System (UMTS); LTE; Architecture enhancements for non-3GPP accesses (3GPP TS 23.402 version 10.5.0 Release 10)", Oct. 1, 2011.

Alcatel-Lucent: "Solution for Trusted WLAN w/o UE impact", 3GPP Draft S2-111627, Apr. 6, 2011.

Intel et al: "Solution for Trusted WLAN access to EPC", 3GPP Draft S2-113148V2, Jul. 5, 2011.

Taaghol P et al: "Seamless integration of mobile WiMAX in 3GPP networks", Oct. 2008 (Oct. 1, 2008), pp. 74-85.

USPTO Jan. 27, 2014 Non-Final Office Action from U.S. Appl. No. 13/554,873.

USPTO Oct. 25, 2013 Non-Final Office Action from U.S. Appl. No. 13/554,873.

USPTO May 21, 2014 Final Office Action from U.S. Appl. No. 13/554,873.

PRC Feb. 2, 2015 SIPO First Office Action from Chinese Application Serial No. 201210491799.X.

USPTO Nov. 7, 2014 Notice of Allowance from U.S. Appl. No. 13/554,873.

* cited by examiner

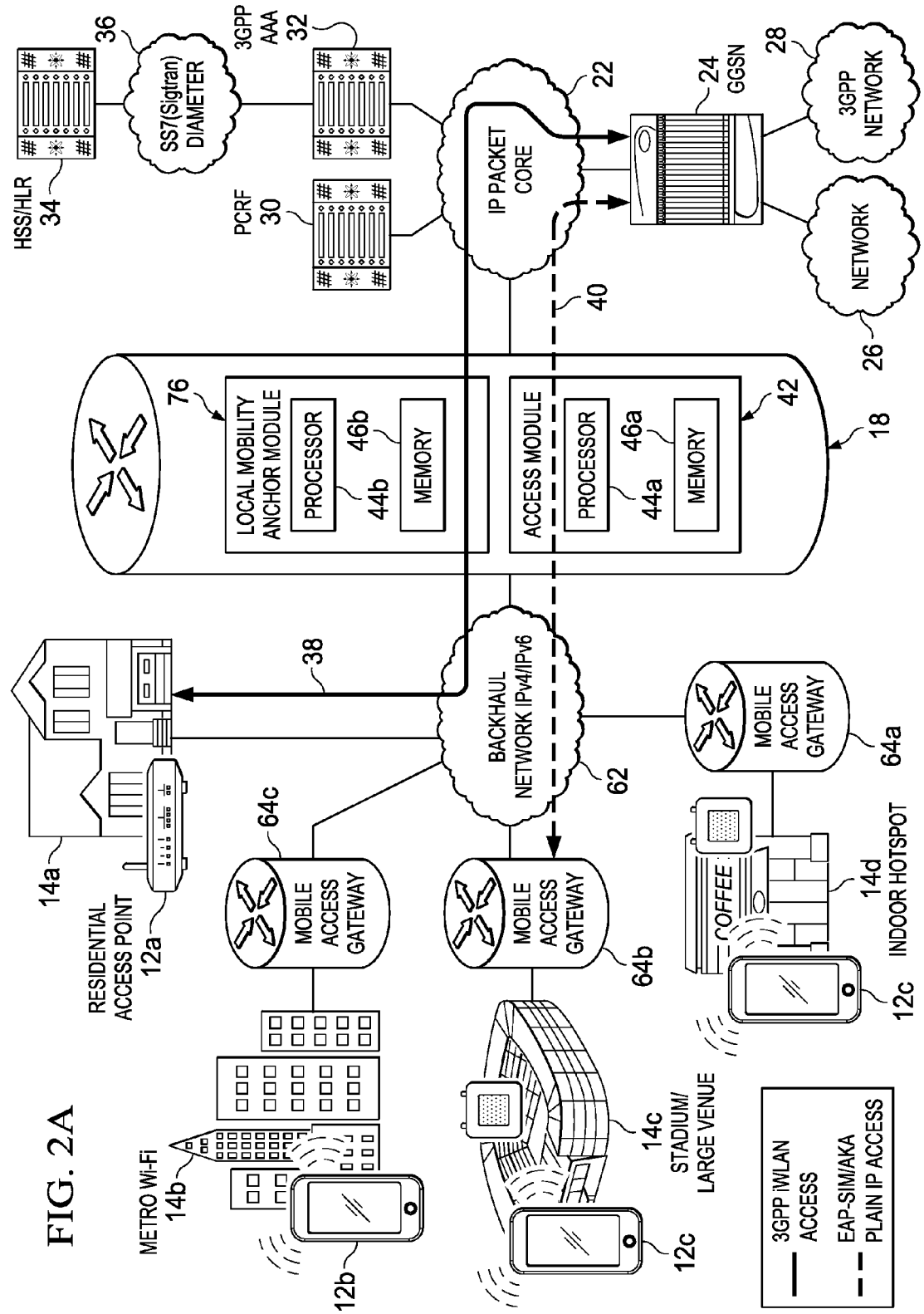

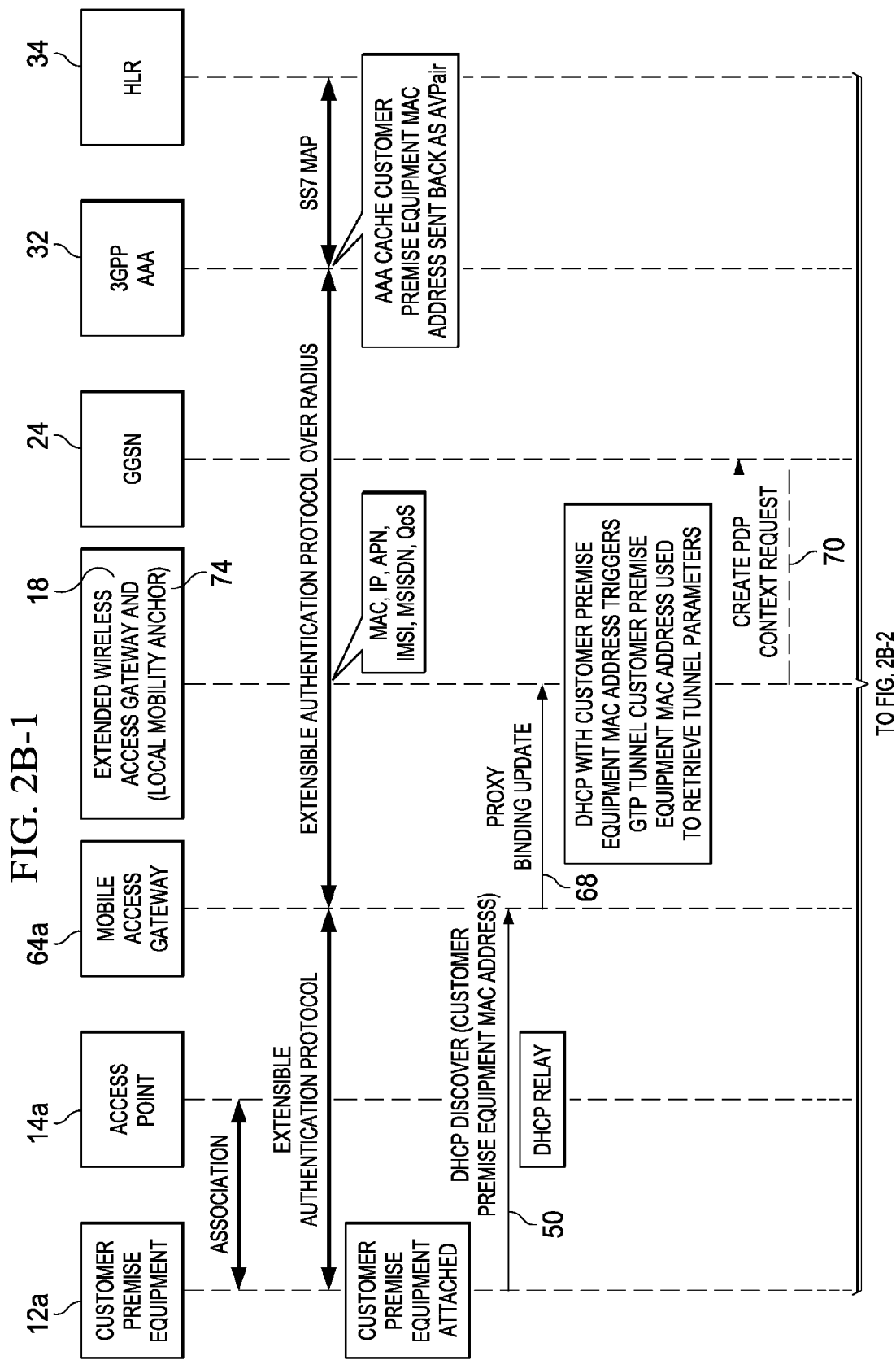

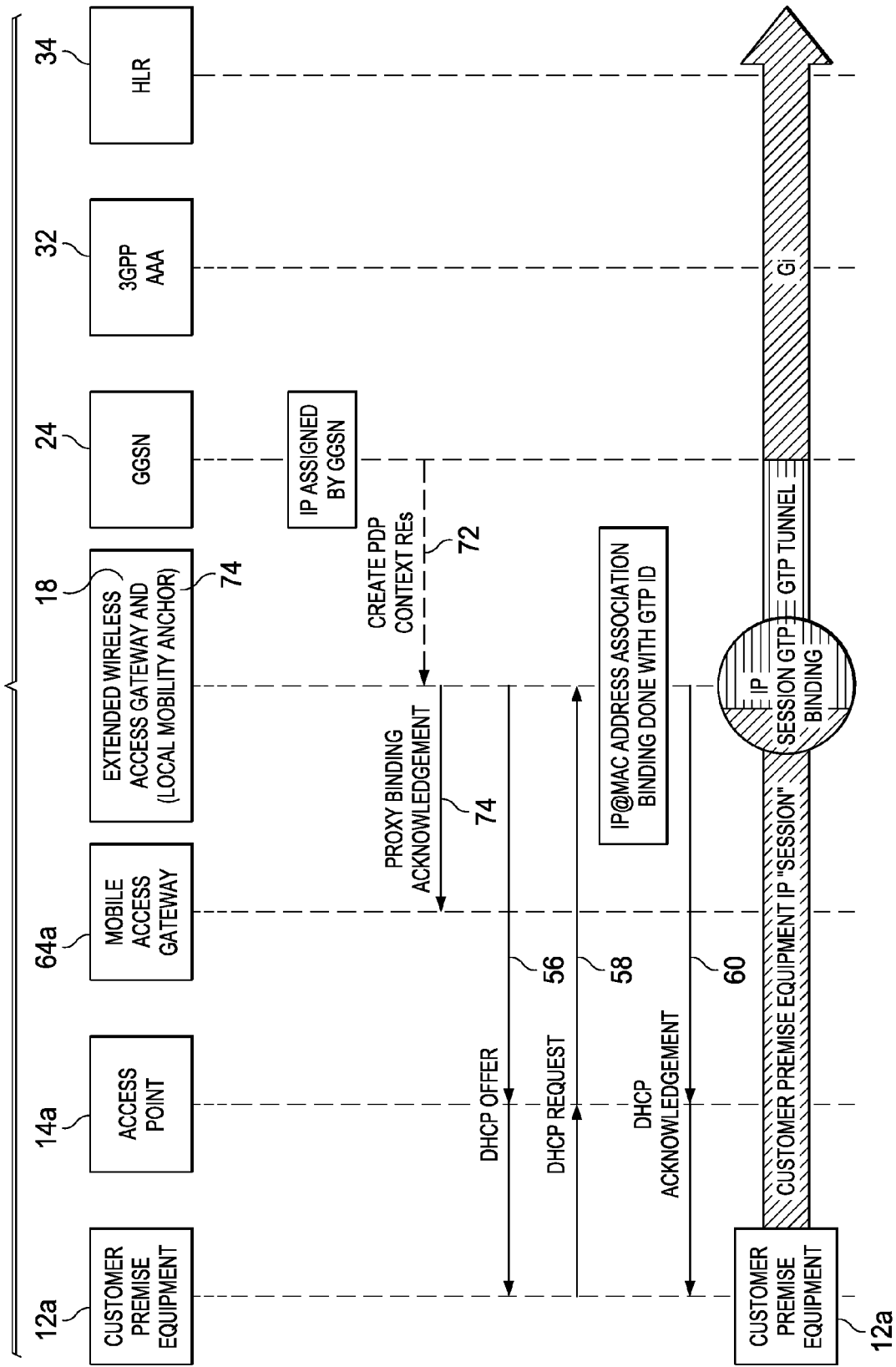

SYSTEM AND METHOD FOR EXTENDED WIRELESS ACCESS GATEWAY SERVICE PROVIDER WI-FI OFFLOAD

TECHNICAL FIELD

This disclosure relates in general to the field of communications and, more particularly, to extended wireless access gateway service provider Wi-Fi offload.

BACKGROUND

Networking architectures have grown increasingly complex in communications environments, particularly mobile wireless environments. Wireless communication technologies are used in connection with many applications, including satellite communications systems, portable digital assistants (PDAs), laptop computers, mobile devices (e.g., cellular telephones, user equipment), etc. Wireless communication technologies are handling increasing amounts of data traffic volume, and the types of data being transported through mobile wireless networks have changed dramatically. This is in part because mobile devices are becoming more sophisticated and, further, are able to engage in more data-intensive activities such as displaying movies or playing video games. Video, file-sharing, and other types of usages (more traditionally associated with wired networks) have been gradually displacing voice as the dominant traffic in mobile wireless networks. There is a significant challenge for mobile operator providers to maintain a relationship with subscribers when they access Wi-Fi networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a simplified block diagram in accordance with another embodiment of the present disclosure;

FIG. 2B is a simplified time diagram illustrating possible example details associated with the communication system.

DETAILED DESCRIPTION OF EXAMPLE EMBODIMENTS

Overview

A method is provided in one example embodiment and includes receiving a dynamic host configuration protocol (DHCP) discovery signal at a wireless network element from a customer premise equipment; requesting that a data session be established at a gateway; receiving an Internet protocol (IP) address; and communicating the IP address to the customer premise equipment.

In more specific embodiments, the gateway is a General packet radio service support node (GGSN) or a packet data network gateway (PDN-GW). In other implementations, the method may include receiving the IP address and a media access control address (MAC) from the customer premise equipment. In other instances, the method may include binding the IP address and the MAC address; and communicating the binded IP address and MAC address to the GGSN or the PDN-GW.

Other example provisioning scenarios may include establishing a GTP tunnel with the GGSN or the PDN-GW. Mobility of the customer premise equipment can be managed by a local mobility anchor. In addition, a request for establishing the data session can be a packet data protocol context. The method may also include receiving a proxy binding update from an access gateway, where the proxy binding update was sent in response to receiving the DHCP discovery signal from the customer premise equipment.

Example Embodiments

Figure 1A:
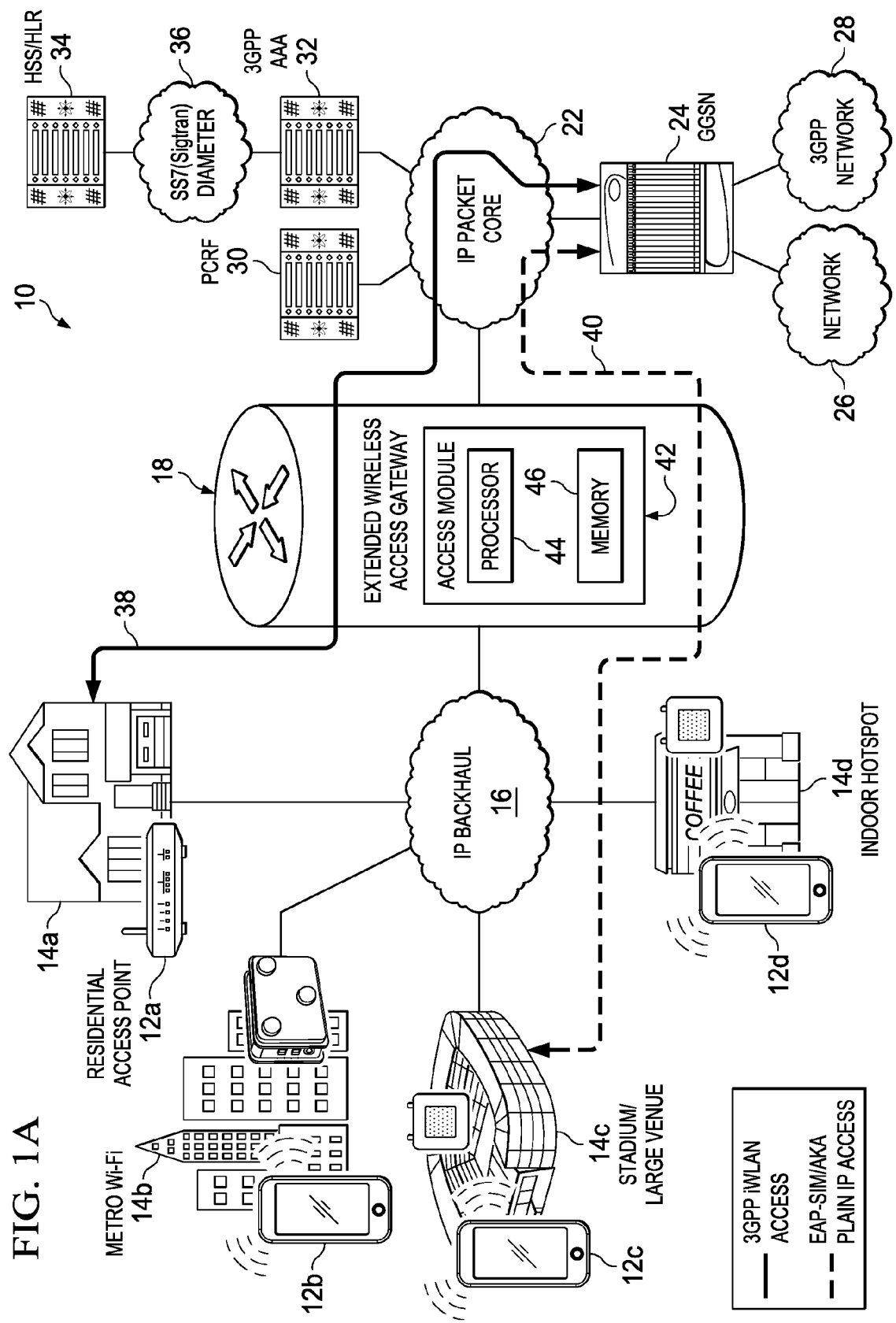
FIG. 1A is a simplified block diagram of a communication system for extended wireless access gateway service provider Wi-Fi offload in accordance with one embodiment of the present disclosure.

Turning to FIG. 1A, FIG. 1A is a simplified block diagram of a communication system 10 for extended wireless access gateway service provider Wi-Fi offload in accordance with one embodiment of the present disclosure. Communication system 10 includes customer premise equipment (CPEs) 12a-d, wireless access points (WAPs) 14a-d, a first network 16 (e.g., an Internet Protocol (IP) backhaul network), an extended wireless access gateway (EWAG) 18, a second network 22 (e.g., an IP packet core network or an general packet radio service network (GPRS)), a GPRS support node (GGSN) or a packet data network gateway (PDN-GW) 24, a third network 26 (e.g., Internet), a fourth network 28 (e.g., a third generation partnership project (3GPP) network), a policy and charging rules function (PCRF) node 30, a 3GPP authentication, authorization, and accounting (AAA) node 32, a home location register/home subscriber server (HSS/HLR) 34, a fifth network 36 (e.g., signaling system seven (SS7) (Sigtran), Diameter). EWAG 18 contains an access module 42. Access module 42 contains a processor 44a and a memory 46a.

In one particular instance, communication system 10 may be configured to achieve Wi-Fi Offload of 3G radio network without the need for specific client software. For example, a signal 38 (e.g., a 3GPP interworking WLAN (IWLAN) access signal) and a signal 40 (e.g., a plain IP access signal) may be generated in the network. Certain embodiments of the present disclosure offer a proxy interworking wireless local area network (PIWLAN) model, which defines an innovative solution for various groups (e.g., mobile operators). The can provide a solution to leverage trusted WiFi access to achieve WiFi offload of 3G radio networks without the need for a specific client software.

The framework of communication system 10 can solve a significant problem for mobile operators, who seek to leverage trusted WiFi access. For example, with PIWLAN, the mobile operator can leverage existing GGSNs, where Legal Interception, charging, deep packet inspection (DPI) and value added services have been already deployed. Furthermore, there is no need for a specific client to be installed on the user equipment and, as such, the solution would engender a mass deployment. The interworking with 3GPP GGSN can further enhance the ability to offer a complete solution for WiFi aggregation: not only for mobile operators, but also for cable operators, wireline operators, etc.

For purposes of illustrating certain example techniques of communication system 10, it is important to understand the communications that may be traversing the network. The following foundational information may be viewed as a basis from which the present disclosure may be properly explained. 3GPP specifies an intelligent wireless local area networking (IWLAN) architecture as a way to integrate Wi-Fi access as part of a 3G mobile operator network. One problem is that current architecture, procedures, and protocols, require the deployment and management of software application into CPEs. In IWLAN, some mobile operators and users desire an architecture where the integration of Wi-Fi in mobile aggregation is done with a network based solution such that no specific software needs to be loaded on the CPEs.

A proxy IWLAN (PIWLAN) model provides a mechanism to achieve this objective in the context of a 3G mobile network. Existing network based architectures are based on mobile IP and proxy mobile IP and do not envisage the GGSN or PDN-GW as the anchor point. The GGSN is the wireless gateway for a third generation (3G) network while PDN-GW is the wireless gateway for a fourth generation (4G) network. As used herein in this Specification, the term 'GGSN' should be understood to mean a GGSN for a 3G network and a PDN-GW for a 4G network.

The PIWLAN is based on managed Wi-Fi access, 802.1X EAP-SIM/EAP-AKA authentication on the CPEs (e.g., CPEs 12a-d) and WAPs (e.g., WAPs 14a-d), and the introduction of a network node consolidating WAG and TTG functions into an EWAG (e.g., access module 42). Using access module 42, EWAG 18 can implement a Gn like a TTG or perform IWLAN client emulation (thus being aggregated by an IWLAN TTG). In addition, EWAG may have direct interface to a policy server (e.g., PCRF 30) and can perform network breakout capabilities. In an embodiment, EWAG 18 may also function as a PMIPv6 local mobility anchor (LMA) interface via GTP over a Gi interface (i.e., an IP based interface between the GGSN and a public data network (PDN) either directly to the Internet or through a WAP gateway) to a GGSN for IP address assignment.

EWAG 18 may be configured with full mobility and an authentication/authorization model that allows EWAG 18 to message directly to HLR/HSS 34. Such an approach does not require a specific client and allows an easy and intuitive mechanism to have access to mobile services by using Wi-Fi as just another type of wireless access. In addition, seamless integration of managed Wi-Fi into existing mobile packet core aggregation can allow for the value added services (VAS) that are available to mobile users (e.g., IMS, RCS, etc) to be available to Wi-Fi users as well.

Further, reusing for Wi-Fi users current charging, LI and provisioning defined for mobile users may be offered. Also, the system can allow for offering an offload mechanism for Internet data access (while keeping control of CPEs 12a-d by offering value address services), and for the aggregation of PMIPv6 base Wi-Fi infrastructure into the 3G packet core. Further, migration to 4G packet core infrastructure via domain chaining (which already defines PMIPv6 interface via s2a) can be realized. In addition, operators can manage service, billing, and access with a common, existing mobile core infrastructure and may maintain a relationship with subscribers when they roam onto Wi-Fi networks. The system further may allow scalable offload of 3G UMTS networks.

In accordance with one example implementation, communication system 10 can allow extended wireless access gateway service provider Wi-Fi offload. In operation, EWAG 18 could be located in the same network that WAPs 14a-d are deployed or can be reachable via a layer three (3) routed connectivity. CPEs 12a-d could also be aggregated into EWAG 18 by a tunneling mechanism. In an embodiment, CPEs 12a-d can be authenticated by using 802.1X EAP. During the EAP authentication phase, EWAG 18 may act as a radius proxy for all WAPs 14a-d that need to be aggregated. EWAG 18 can store the IDs from CPEs 12a-d received from 3GPP-AAA 32 the MSISDN, negotiated QoS, and APN.

With this information, EWAG 18 may resolve an issue where WAPs 14a-d find out the GGSN IP address and send a create-packet-data-protocol-context. A packet data protocol (PDP) context offers a packet data connection over which the CPE and the network can exchange IP packets. For example, GTP V1 may be used. If authentication was successful, GGSN 24 can answer back with a create-pdp-context response containing a CPE's IP address and DNS. At a certain stage EWAG 18 may receive the response from GGSN 24 and then answer back with a DHCP offer including the assigned IP address, DNS, and put the IP address of EWAG 18 as the default IP address. EWAG 18 may be located on same subnet as GGSN 24; otherwise EWAG 18 will need to maintain a map of WAPs 14a-d to specific subnets. After the DHCP process is finalized, traffic may flow into EWAG 18 where the traffic is encapsulated into GTP-U messages and sent to GGSN 24.

In an embodiment, GTP proxy interworking can be initiated at a PMIPv6 LMA. For example, upon receipt of first sign of life (FSOL) from a CPE a PMIPv6 mobility access gateway (MAG) may issue a proxy binding update (PBU) toward the selected LMA. When the LMA receives the PBU, it may initiate a GTP tunnel and issue a PDP context create request to the GGSN. The GGSN can respond back with an address allocated from an access point name (APN) pool of addresses. The LMA may then issue a proxy binding acknowledge (PBA) that contains the IP address from the GGSN to the binding to the local subnet CoA. The MAG may use the IP address of the CPE to recognize/service the CPE on its locally attached subnet. The LMA then responds to the original DHCP discovery request from the CPE with an offer of the IP address returned from the GGSN and completes the address configuration process. If the CPE moves within the PMIPv6 domain, mobility is managed by the LMA and the GGSN is not involved. The CPE is able to move from MAG to MAG without having to change its IP address.

EWAG 18 acts as DHCP Server for selected CPEs (e.g., those with EAP-SIM/EAP-AKA), since the IP will be served from the GGSN. By configuring EWAG 18 to act as a DHCP server (e.g., using access module 42), other types of access where the DHCP server should be located on the EWAG or external server are not limited. This will allow a mobile subscriber on a WLAN to have common service management, service characteristics, access and billing on the GGSN, with the existing UMTS mobile core infrastructure.

In terms of the infrastructure of the present disclosure, CPEs 12a-d can be associated with clients, customers, endpoints, handheld devices, or end users wishing to initiate a communication in communication system 10 via some network. The term 'CPE' is inclusive of devices used to initiate a communication, such as a receiver, a computer, a set-top box, an Internet radio device (IRD), a cell phone, a smart phone, a tablet, a personal digital assistant (PDA), or any other device, component, element, or object capable of initiating voice, audio, video, media, or data exchanges within communication system 10. CPEs 12a-d may also be inclusive of a suitable interface to the human user, such as a display, a keyboard, a touchpad, a remote control, or other terminal equipment. CPEs 12a-d may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

WAPs 14a-d are configured to connect one or more CPEs 12a-d to a network (e.g., first network 16). WAPs 14a-d may resemble a network hub, relaying data between connected wireless devices (e.g., CPEs 12a-d) in addition to a connected wired device, most often an Ethernet hub or switch. Thus, allowing wireless devices to communicate with other wired and wireless devices.

First network 16, second network 22, third network 26, fourth network 28, and fifth network 36 represent a series of points or nodes of interconnected communication paths for receiving and transmitting packets of information that propagate through the architecture. First network 16, second network 22, third network 26, fourth network 28, and fifth network 36 each offer a communicative interface between sources and/or hosts, and each may be any local area network (LAN), wireless local area network (WLAN), metropolitan area network (MAN), Intranet, Extranet, WAN, virtual private network (VPN), or any other appropriate architecture or system that facilitates communications in a network environment. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

First network 16, second network 22, third network 26, fourth network 28, and fifth network 36 may implement a UDP/IP connection and use a TCP/IP communication language protocol in particular embodiments of the present disclosure. Further, first network 16, second network 22, third network 26, fourth network 28, and fifth network 36 may implement any other suitable communication protocol for transmitting and receiving data packets within the architecture. Data, as used herein in this document, refers to any type of numeric, voice, video, media, or script data, or any type of source or object code, or any other suitable information in any appropriate format that may be communicated from one point to another.

First network 16 may be a backhaul network (e.g., an Internet Protocol (IP) backhaul network) that comprises intermediate links between a core network, or backbone, of the network and the small subnetworks at the "edge" of a hierarchical network. First network 16 may be configured to transmit from a remote site or network to a central or main site and may include a high-capacity line; for example, to backhaul from a wireless mesh network to the wired network by aggregating the traffic on the wireless mesh over one or more high-speed lines to a private network or the Internet.

Second network 22 (e.g., an IP packet core network or an general packet radio service network (GPRS)) may be a packet oriented mobile data service on a 2G and 3G cellular communication system's global system for mobile communications (GSM). Third network 24 may be a GPRS core network and allow 2G, 3G and WCDMA mobile networks to transmit IP packets to external networks such as the Internet.

PCRF node 30 may be configured to determine policy rules in real-time in a multimedia network. PCRF node 30 can operate at a network core and access subscriber databases and other specialized functions, such as charging systems, in a scalable and centralized manner. PCRF node 30 is the part of the network architecture that aggregates information to and from the network, operational support systems, and other sources (such as portals) in real time, supporting the creation of rules and then automatically making policy decisions for each CPE 12a-d active on the network. 3GPP AAA node 32 may provide authentication, authorization, and accounting for CPEs 12a-d accessing and using communication system 10. HSS/HLR 34 may provide management of a centralized subscriber database of CPEs 12a-d accessing and using communication system 10.

Fifth network 36 may include a set of telephony signaling protocols which are used to set up public switched telephone network telephone calls using various protocols (e.g., SS7 (Sigtran)). One purpose of the SS7 protocol is to set up and tear down telephone calls, number translation, local number portability, prepaid billing mechanisms, short message service (SMS), and a variety of other market services. Sigtran protocols are an extension of the SS7 protocol family that support the same application and call management paradigms as SS7 but uses an IP transport called stream control transmission protocol (SCTP). For example, one protocol defined by the Sigtran group is SCTP, which is used to carry PSTN signaling over IP.

Diameter protocol SCTP for transport and is used widely in all-IP, service-oriented IMS and LTE architectures. Within the IMS control and service planes, Diameter plays a central role in policy, charging, authentication and mobility management. Diameter applications, build upon the basic standard to enable services such as IP mobility, SIP authentication, and online charging. Diameter protocols provide a flexible, scalable IP signaling platform for broadband IP networks, complementing other signaling protocols such as SS7 and Sigtran. (e.g., SS7 (Sigtran) Diameter).

EWAG 18, GGSN 24, the local mobility anchor, and the PDN-GW are network elements that can facilitate the access activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, EWAG 18, GGSN 24, the local mobility anchor, and/or PDN-GW include software to achieve (or to foster) the access activities discussed herein. This could include the implementation of instances of access modules 42. Additionally, each of these elements can have an internal structure (e.g., a processor, a memory element, etc.) to facilitate some of the operations described herein. In other embodiments, these access activities may be executed externally to these elements, or included in some other network element to achieve the intended functionality. Alternatively, EWAG 18, GGSN 24, the local mobility anchor, and the PDN-GW may include software (or reciprocating software) that can coordinate with other network elements in order to achieve the access activities described herein. In still other embodiments, one or several devices may include any suitable algorithms, hardware, software, components, modules, interfaces, or objects that facilitate the operations thereof.

Figure 1B:
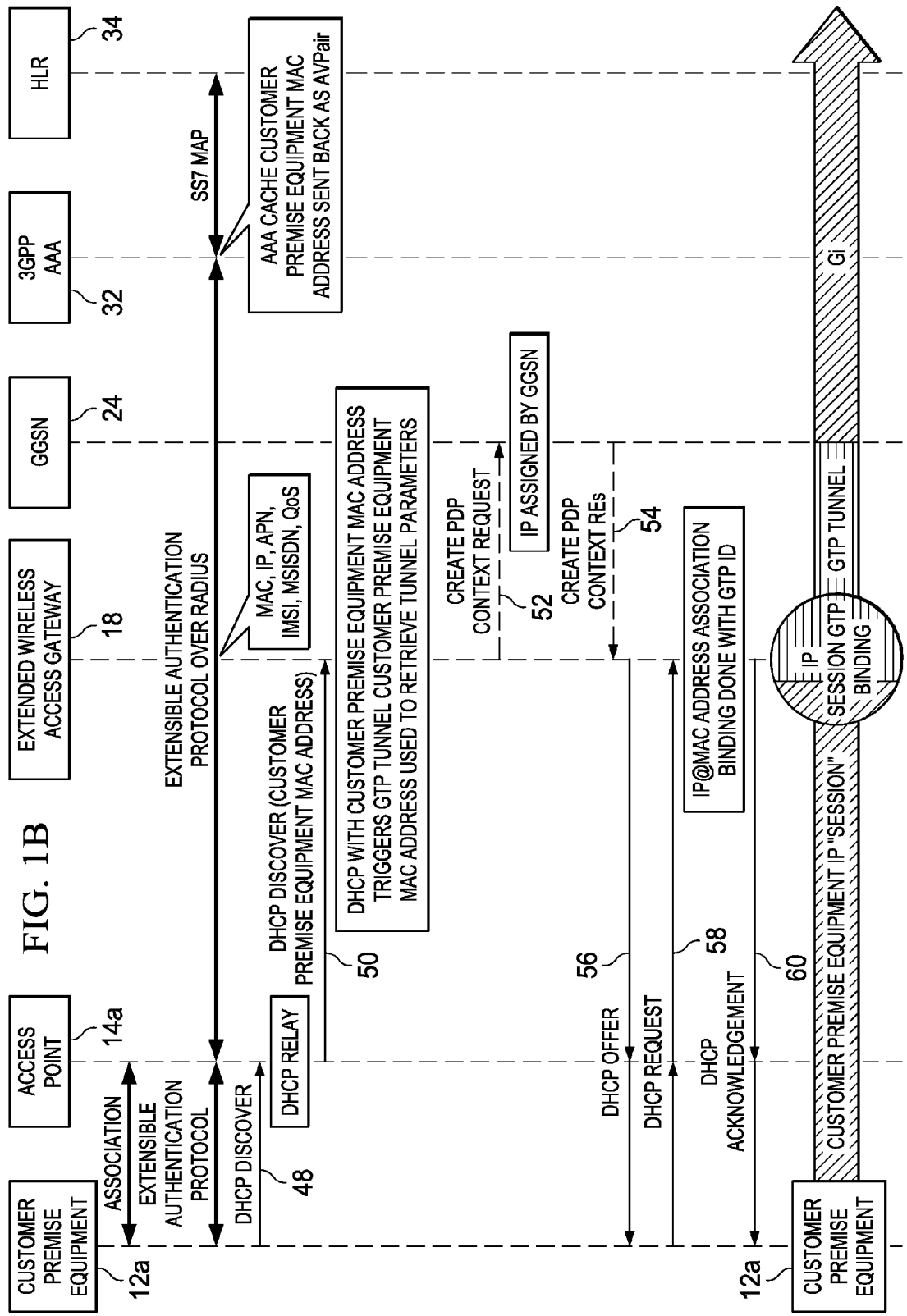
FIG. 1B is a simplified time diagram illustrating possible example details associated with the communication system.

Turning to FIG. 1B, FIG. 1B is a simplified block diagram illustrating one possible set of details associated with communication system 10. This particular configuration includes CPE 12a, WAP 14a, EWAG 18, GGSN 24, 3GPP AAA 32, and HLR 34. In operational terms, CPE 12*a* sends an association request to WAP 14*a*. Extensible authentication protocol (EAP) is used to establish a connection between CPE 12*a* and WAP 14*a*. Also, EAP over radius is used to establish a connection between access point 14*a* and 3GPP AAA 32 and an SS7 map may be used to establish a connection between 3GPP AAA 32 and HLR 34 to authenticate CPE 12*a*.

A dynamic host configuration protocol (DHCP) discovery message 48 is sent from CPE 12*a* to WAP 14*a* and WAP 14*a* sends a DHCP discovery message relay 50 to EWAG 18. In response to the DHCP discovery message relay 50, EWAG 18 sends a create PDP context request 52 to GGSN 24. The create PDP context request 52 is a request to obtain an IP address for CPE 12*a* from GGSN 24. GGSN 24 sends a response 54 to the create PDP context request 52 to EWAG 18. Using the IP address from GGSN 24, EWAG 18 sends response 56 to DHCP discovery request 50 sent by CPE 12*a*. CPE 12*a* sends a DHCP request 58 (including the MAC address of CPE 12*a* and IP address from GGSN 24) to EWAG 18. EWAG 18 uses the MAC address and IP address for association binding with a GTP ID and sends an DHCP acknowledgement 60 to CPE 12*a*. As a result, a Wi-Fi link is created using EWAG 18. More specifically, an IP session is enabled from CPE 12*a* to EWAG 18. At EWAG 18, access module 42 communicates the IP session in GTP binding to GGSN 24 using a GTP tunnel. GGSN 24 connects to the Internet using a Gi interface.

Figure 1C:
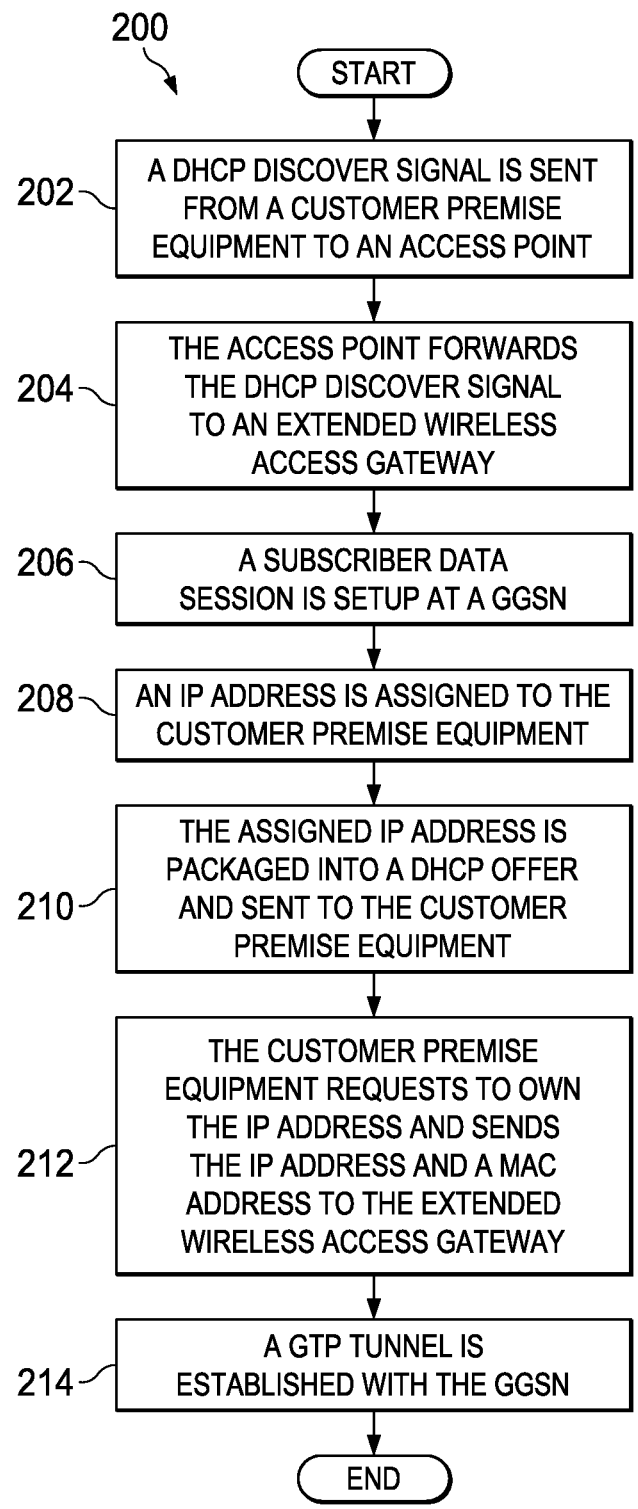
FIG. 1C is a simplified flowchart illustrating potential operations associated with the communication system.

Turning to FIG. 1C, FIG. 1C is a simplified flowchart 200 illustrating example activities of extended wireless access gateway service provider Wi-Fi offload. At 202, a DHCP discovery signal is sent from a CPE to an access point. For example, a DHCP discovery signal may be sent from CPE 12*a* to EWAG 12*a*. At 204, the access point forwards the DHCP signal to an EWAG. For example, WAP 14*a* may forward the DHCP signal to EWAG 18. At 206, a subscriber data session is set up at a GGSN. For example, EWAG 18 may start a subscriber data session with GGSN 24.

At 208, an IP address is assigned to the CPE. For example, GGSN 24 may assign an IP address to CPE 12*a*. At 210, the assigned IP address is packaged into a DHCP offer and sent to the CPE. For example, EWAG 18 may package the IP address received from GGSN 24 and send the packaged IP address to CPE 12*a*. At 212, the CPE requests to own (be assigned) the IP address and sends the IP address and a MAC address to the EWAG. For example, CPE 12*a* may request to be assigned the IP address from GGSN 24 and send the IP address and the CPE's 12*a* MAC address to EWAG 18. At 214, a GTP tunnel is established with the GGSN. For example, a GTP tunnel may be established between EWAG 18 and GGSN 24. Using the GTP tunnel, EWAG 18 may achieve Wi-Fi Offload of 3G radio network without the need for a specific client software on CPE 12*a*.

Turning to FIG. 2A, FIG. 2A is a simplified block diagram of an example embodiment of communication system 10, which is configured for extended wireless access gateway service provider Wi-Fi offload. Communication system 10 includes CPEs 12*a-d*, WAPs 14*a-d*, mobile access gateways (MAGs) 64*a-c*, backhaul network 62 (e.g., IPv4 or IPv6 backhaul network), EWAG 18, second network 22 (e.g., an IP packet core network or a GPRS), GGSN 24, third network 26 (e.g., Internet), fourth network 28 (e.g., 3GPP network), PCRF node 30, 3GPP AAA node 32, HSS/HLR 34, a fifth network 36 (e.g., SS7 (Sigtran) Diameter). EWAG 18 contains an access module 42 and LMA module 76. In an embodiment, LMA module 76 is separate and distinct from EWAG 18. Access module 42 contains processor 44*a* and memory 46*a*. LMA module 76 contains processor 44*b* and memory 46*b*.

Using access module 42, EWAG 18 may support a PMIPv6 access network via GTP proxy operation. The GTP proxy operation may be initiated at LMA module 76. More specifically, upon receipt of FSOL from a specific CPE 12*a-d*, a corresponding MAG 64*a-c* may issue of proxy binding update (PBU) towards LAM module 76.

When LMA module 76 receives the PBU, LMA module 76 may initiate a GTP tunnel and issue a PDP context create request to the GGSN. GGSN will respond back with an IP address for the specific CPE 12*a-d*, where the IP address may be allocated from an APN pool of addresses. LMA module 76 may then issue a proxy binding acknowledge (PBA) with the IP address of the specific CPE 12*a-d* to the corresponding MAG 64*a-c* for binding to the local subnet. MAG 64*a-c* may use the IP address of the specific CPE 12*a-d* to recognize/service the specific CPE 12*a-d* on a locally attached subnet.

Access module 42 then responds to the original DHCP discovery message from CPE 12*a-d* with an offer of the IP address returned from GGSN 24 and completes the address configuration process. If CPE 12*a-d* moves within the PMIPv6 domain, mobility is managed by the LMA module 76 and GGSN 24 is not involved. EWAG 18 also uses access module 42 to act as a DHCP server for selected CPE 12*a-d* (i.e., those with EAP-SIM/EAP-AKA), since the IP addresses will be served from GGSN 24.

In an embodiment, configuring a GTP tunnel from EWAG 18 to GGSN 24, certain information is needed. For example, EWAG 18 may perform a radius proxy of EAP-SIM/EAP-AKA authentication. In another example, the specific CPE 12*a-d* MAC address can be used to bind IMSI provided in EAP authentication with IP assigned via DHCP (possible to be leverage from AAA, on Access-Accept). Further, the MAC address of the specific CPE 12*a-d* may be included into a calling-station-ID (Attr 31) radius attribute in the EAP authentication procedure. 3GPP AAA node 32 can provide a MSISDN and an APN as part of an EAP-ACCEPT message. In addition, GGSN 24 can provide an IP address for the specific CPE 12*a-d* and GGSN 24 can provide the DNS for the specific CPE 12*a-d* as well. In an embodiment, GGSN 24 remains as a PCEF/charging element. MAG 64*a-c* may be configured to use ISG for both authentication and FSOL session triggers. For example, some FSOL triggers that may be supported for EWAG 18 operations include IPv6 router solicitation message, unclassified MAC address, unclassified IP address, etc.

GGSN 24 is configured for traffic policy enforcement and is also the anchor point for the Wi-Fi session initiated by the specific CPE 12*a-d* (e.g., all data for the specific CPE 12*a-d* travels through GGSN 24 via APN point of attachment). If local traffic breakout is required (e.g., bypassing GGSN data plane), then subscriber QoS and access policy may be pushed to EWAG 18 via Radius or Diameter protocol messages. ISG can be reused for this purpose providing that Radius/AAA messages can be proxied or translated to the interface with the MPC policy infrastructure. Alternatively, 3GPP policy interfaces can be directly exposed on EWAG 18.

Turning to FIG. 2B-1, FIG. 2B-1 (in conjunction with FIG. 2B-2) is a simplified block diagram illustrating one possible set of details associated with communication system 10. This particular configuration includes CPE 12*a*, access point 14*a*, MAG 64*a*, EWAG 18/LMA module 76, GGSN 24, 3GPP AAA 32, and HLR 34. In operational terms, CPE 12*a* sends an association request to access point 14*a* that is communicated to MAG 64*a*. EAP is used to establish a connection between CPE 12*a* and access point MAG 64*a*. Also, EAP over radius is used to establish a connection between MAG 64*a* and 3GPP AAA 32 and an SS7 map may be used to establish a connection between 3GPP AAA 32 and HLR 34 to validate CPE 12*a*.

A DHCP discovery message 50 is sent from CPE 12*a* to MAG 64*a* and MAG 64*a* sends a proxy binding update 68 to EWAG 18. In response to the proxy binding update 68, EWAG 18 sends a create PDP context request 70 to GGSN 24. The create PDP context request 70 is a request to obtain an IP address for CPE 12*a* from GGSN 24 and authenticate CPE 12*a*.

Turning to FIG. 2B-2, FIG. 2B-2 (in conjunction with FIG. 2B-1) is a simplified block diagram illustrating one possible set of details associated with communication system 10. GGSN 24 sends a response 72 to the create PDP context request 70 to EWAG 18/LMA module 76. Using the IP address from GGSN 24, EWAG 18/LMA module 76 sends response 74 to DHCP discovery request 50 sent by CPE 12*a*. CPE 12*a* sends a DHCP request 58 (including the MAC address of CPE 12*a* and IP address from GGSN 24) to EWAG 18/LMA module 76. EWAG 18/LMA module 76 uses the MAC address and IP address for association binding with a GTP ID and sends an DHCP acknowledgement 60 to CPE 12*a*. As a result, a Wi-Fi link is created using EWAG 18. More specifically, an IP session is enabled from CPE 12*a* to EWAG 18. At EWAG 18, access module 42 communicates the IP session in GTP binding to GGSN 24 using a GTP tunnel. GGSN 24 connects to the Internet using a Gi interface.

Figure 2C:
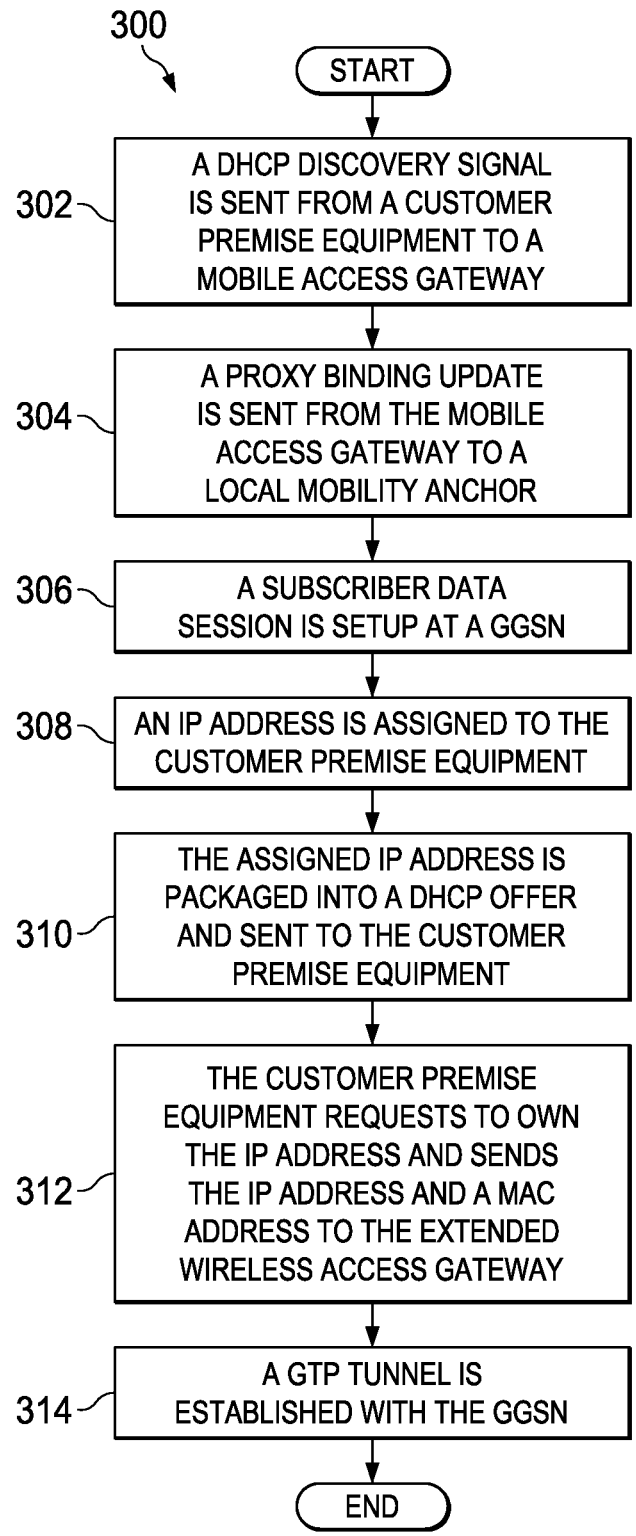
FIG. 2C is a simplified flowchart illustrating potential operations associated with the communication system.

Turning to FIG. 2C, FIG. 2C is a simplified flowchart 300 illustrating example activities of EWAG service provider Wi-Fi offload. At 302, a DHCP discovery signal is sent from a CPE to a MAG. For example, a DHCP discovery signal may be sent from CPE 12*a* to MAG 64*a*. At 304, a proxy binding update is sent from the MAG to a LMA. For example, MAG 64*a* may send a proxy binding update to LMA module 76. At 306, a subscriber data session is set up at a GGSN. For example, EWAG 18 may start a subscriber data session with GGSN 24.

At 308, an IP address is assigned to the CPE. For example, GGSN 24 may assign an IP address to CPE 12*a*. At 310, the assigned IP address is packaged into a DHCP offer and sent to the CPE. For example, EWAG 18 may package the IP address received from GGSN 24 and send the packaged IP address to CPE 12*a*. At 312, the CPE requests to own (be assigned) the IP address and sends the IP address and a MAC address to the EWAG. For example, CPE 12*a* may request to be assigned the IP address from GGSN 24 and send the IP address and the CPE's 12*a* MAC address to EWAG 18. At 314, a GTP tunnel is established with the GGSN. For example, a GTP tunnel may be established between EWAG 18 and GGSN 24. Using the GTP tunnel, EWAG 18 may achieve Wi-Fi offload of 3G radio network without the need for a specific client software on CPE 12*a*.

As identified previously, a network element (e.g., a gateway) can include software to achieve the access management operations, as outlined herein in this document. In certain example implementations, the access management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processor 44*a* shown in FIGS. 1A and 2A and processor 44*b* shown in FIG. 2A], or other similar machine, etc.). In some of these instances, a memory element [memory 46*a* shown in FIGS. 1A and 2A and memory 46*b* shown in FIG. 2A] can store data used for the operations described herein. This includes the memory element being able to store software, logic, code, or processor instructions that are executed to carry out the activities described in this Specification. The processor (e.g., processor 44*a* and 44*b*) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the access activities as outlined herein. Additionally, each of these devices may include a processor that can execute software or an algorithm to perform the access management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a dynamic host configuration protocol (DHCP) discovery signal at a wireless network element, functioning as a DHCP server, from a customer premise equipment;
   receiving a proxy binding update from an access gateway, wherein the proxy binding update was sent in response to receiving the DHCP discovery signal from the customer premise equipment;
   communicating a request from the wireless network element that a data session be established at a gateway anchor point, wherein the gateway is a General packet radio service support node (GGSN) or a packet data network gateway (PDN-GW);
   receiving at the wireless network element, an Internet protocol (IP) address;
   communicating the IP address to the customer premise equipment from the wireless network element;
   receiving the IP address and a media access control address (MAC) from the customer premise equipment;
   binding the IP address and the MAC address; and
   communicating the binded IP address and MAC address to the GGSN or the PDN-GW.

2. The method of claim 1, further comprising:
   establishing a GTP tunnel with the GGSN or the PDN-GW.

3. The method of claim 1, wherein mobility of the customer premise equipment is managed by a local mobility anchor.

4. The method of claim 1, wherein a request for establishing the data session is a packet data protocol context.

5. The method of claim 1, wherein the wireless network element is an extended wireless access gateway service provider.

6. The method of claim 1, wherein the wireless network element includes Wi-Fi access gateway functions and tunnel termination gateway functions.

7. The method of claim 1, wherein the wireless network element is configured to operate as a radius proxy for a plurality of customer premise equipment.

8. The method of claim 1, wherein the wireless network element and the gateway are on the same subnet.

9. The method of claim 1, wherein the extended wireless access gateway service provider is configured to allow the customer premise equipment to have common service management on a wireless local area network and the GGSN.

10. The method of claim 1, further comprising:
    binding the IP address and the MAC address with a general packet radio service tunneling protocol (GTP) identifier to establish a GTP tunnel with the GGSN or the PDN-GW; and
    communicating the binded IP address and MAC address to the GGSN or the PDN-GW.

11. Logic encoded in non-transitory media that includes code for execution and when executed by a processor operable to perform operations, comprising:
    receiving a dynamic host configuration protocol (DHCP) discovery signal at a wireless network element from a customer premise equipment, wherein the wireless network element is configured to function as a DHCP server;
    receiving a dynamic host configuration protocol (DHCP) discovery signal at a wireless network element, functioning as a DHCP server, from a customer premise equipment;
    receiving a proxy binding update from an access gateway, wherein the proxy binding update was sent in response to receiving the DHCP discovery signal from the customer premise equipment;
    communicating a request from the wireless network element that a data session be established at a gateway anchor point, wherein the gateway is a General packet radio service support node (GGSN) or a packet data network gateway (PDN-GW);
    receiving at the wireless network element, an Internet protocol (IP) address;
    communicating the IP address to the customer premise equipment from the wireless network element;
    receiving the IP address and a media access control address (MAC) from the customer premise equipment;
    binding the IP address and the MAC address; and
    communicating the binded IP address and MAC address to the GGSN or the PDN-GW.

12. The logic of claim 11, the operations further comprising:
    establishing a GTP tunnel with the GGSN or the PDN-GW.

13. The logic of claim 11, wherein mobility of the customer premise equipment is managed by a local mobility anchor.

14. The logic of claim 11, wherein a request for establishing the data session is a packet data protocol context.

15. A network element, comprising:
    a memory element;
    a processor operable to execute instructions associated with electronic code; and
    an access module that interfaces with the processor such that the network element:
       receives a dynamic host configuration protocol (DHCP) discovery signal at a wireless network element, functioning as a DHCP server, from a customer premise equipment;
       receives a proxy binding update from an access gateway, wherein the proxy binding update was sent in response to receiving the DHCP discovery signal from the customer premise equipment;
       requests a packet data protocol context to obtain an IP address for the customer premise equipment and that a data session be established at a gateway anchor point, wherein the gateway is a General packet radio service support node (GGSN) or a packet data network gateway (PDN-GW);
       receives an Internet protocol (IP) address;
       communicates the IP address to the customer premise equipment;

receives the IP address and a media access control address (MAC) from the customer premise equipment;
bind the IP address and the MAC address; and
communicate the binded IP address and MAC address to the GGSN or the PDN-GW.

* * * * *